United States Patent Office 3,541,370
Patented Nov. 17, 1970

3,541,370
DC DYNAMOELECTRIC MACHINE HAVING IMPROVED COMPENSATING WINDING CONNECTIONS
Masahiro Hayashi, Kobe, Japan, assignor to Mitsubishi Denki Kabushiki Kaisha, Tokyo, Japan
Filed Feb. 25, 1969, Ser. No. 801,984
Int. Cl. H02k 17/28
U.S. Cl. 310—186       5 Claims

ABSTRACT OF THE DISCLOSURE

A compensating winding on a main field pole disposed on one portion of a split frame is connected to a connection wire running along a split of the frame without traversing the split. Another compensating winding on the adjacent main field pole disposed on the other portion of the frame is connected to another connection wire which runs along the same split, and the connection wires are arranged to carry current in opposite directions from each other. In this way windings are mechanically separated from each other, but perform their function of compensation.

BACKGROUND OF THE INVENTION

This invention relates to a direct current dynamoelectric machine including compensation windings.

Conventional devices are known comprising direct current dynamoelectric machines of the type including a split frame, and having compensation windings interconnected by connection wires disposed so as not to form a complete turn about the axis of the machine. In such machines some of the connecting wires are connected over two consecutive portions of the split frame, and therefore have been preliminarily designed and constructed such that each of the wires can be mechanically interconnected and separated into two portions upon disassembling the frame. This leads to the necessity of separating all the connection wires extending over the two consecutive portions of the split frame into two wire portions whenever the frame is disassembled. Normally, the compensation windings each have several turns, and the separating operation is particularly cumbersome and undesirable.

Accordingly it is an object of this invention to provide a new and improved direct current dynamoelectric machine including a split frame capable of being disassembled without the necessity of performing the operation of separating the associated compensation windings into the respective wire portions.

SUMMARY OF THE INVENTION

It is another object of the invention to provide improved means for connecting compensation windings of a direct current dynamoelectric machine.

With these objects in view, the invention resides in a direct current dynamoelectric machine of the type including compensation windings inductively disposed the main field poles of a stator, the compensation windings on the adjacent main field pole, and those portions of the arated from each other. One compensation winding on each of the main field poles of the stator may include a portion running along the side surface thereof facing the adjacent main field pole, and those portions of the compensation windings running along the opposite side surface of the adjacent main field poles have currents flowing in the opposite directions from each other.

BRIEF DESCRIPTION OF THE DRAWING

The invention will become more apparent from the following detailed description in conjunction with the accompanying drawing in which.

DESCRIPTION OF THE PREFERRED EMBODIMENTS

Figure 1:
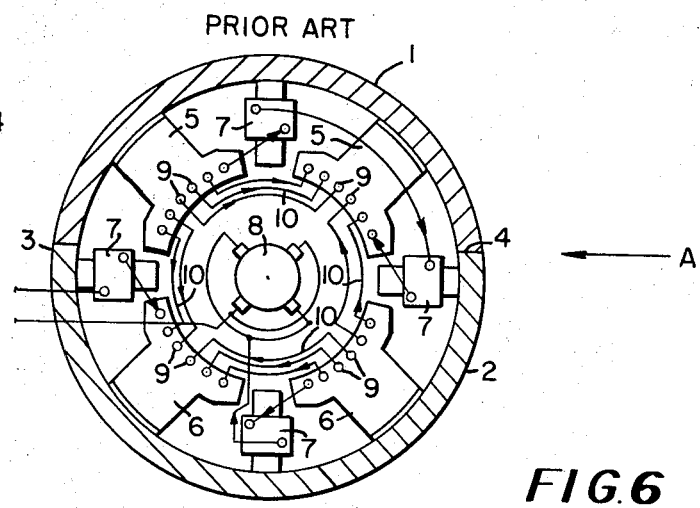
FIG. 1 is a schematic elevational view, partly in cross section of a direct current dynamoelectric machine according to the principles of the prior art.

Referring to FIG. 1 there is illustrated the conventional type of direct current dynamoelectric machine comprising a split frame divided into an upper portion 1 and a lower portion 2 along opposite splits 3 and 4. The frame 1–2 has disposed on the internal surface thereof a plurality of main field poles 5 and 6, separated by alternating interpoles 7 providing a stator. The main field poles 5 are disposed on the upper frame portion 1 while the main field poles 6 are disposed on the lower frame portion 2, and the upper and lower frame portions 1 and 2 can be separated away from each other whenever it is necessary to do so. A rotor 8 is centrally disposed within the frame for rotation relative to the stator.

One compensation winding 9 is inductively disposed on each of the main field poles 5 and 6 and connected to the compensation windings on the adjacent main field poles by connection wires 10 disposed so as not to form a turn about the axis of the machine. This arrangement of the connection wires 10 ensures that no axial voltage is produced on each of the wires. In FIG. 1 it will be seen that one portion of the compensation winding 9 on each main field pole 5 is connected to the adjacent portion of the winding 9 on the adjacent main field pole 6 by the connection wires 10 extending over both the upper and lower frame portions 1 and 2 respectively.

Figure 2:
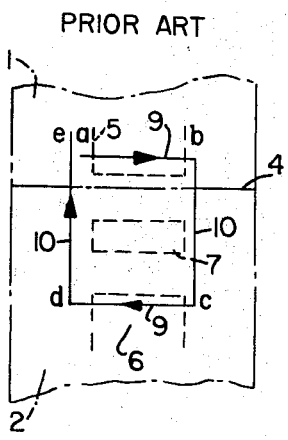
FIG. 2 is a fragmental view of one portion of the machine shown in FIG. 1 as viewed in the direction of the arrow A.
Figures 3, 4:
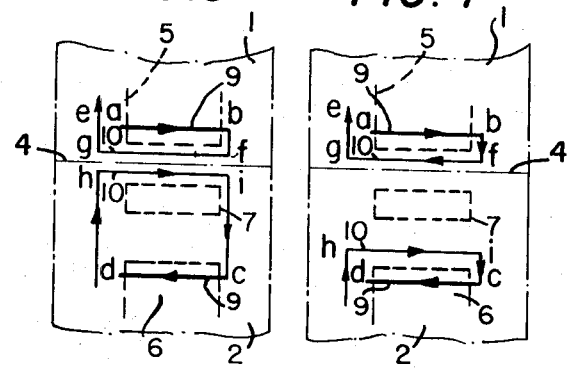
FIGS. 3 and 4 are views similar to FIG. 2 but illustrating two different embodiments of the invention.

Assuming for convenience that the main field poles each include a compensation winding composed of a single turn, FIG. 2 shows the prior art connections, which FIGS. 3 and 4 illustrate embodiments of this invention as shown in FIG. 2, the compensation winding 9, or a–b on the field pole 5 disposed on the upper frame portion 1, is connected to the compensation winding 9, or d–c on the field pole 6 disposed on the lower frame portion 2, by the connection wire 10 or b–c extending over both frame portions, and by the connection wire 10, or d–e extending from the winding d–c toward the upper frame portion. Thus, both wires b–c and d–e extend past the split of the frame. With the arrangement illustrated the connection wires such as b–c and d–e must be separated into two portions whenever the frame is disassembled. To this end, all the connection wires such as wires b–c and d–e extending over both the upper and lower frame portions 1 and 2, respectively, must be preliminarily designed and constructed such that each of the wires can be mechanically interconnected and separated into two portions upon disassembling the frame. As previously mentioned, this measure is very disadvantageous and particularly when the compensation winding includes several turns.

This invention contemplates the elimination of this disadvantage by the provision of improved means for connecting the adjacent compensation windings to each other as shown in FIGS. 3–6.

It is again assumed that each of main field poles includes a compensation winding composed of a single turn only for purpose of explanation. As shown in FIG. 3, a compensation winding 9 or a–b inductively disposed on a main field pole 5 disposed on an upper portion 1 of a split frame such as shown in FIG. 1 has connected thereto a connection wire 10 or b–f–g–e running along a split of the frame on the side of the upper frame portion 1 and toward that field pole without traversing the split. Similarly a compensation winding 9 or d–c on the adjacent main field pole 6 disposed on a lower frame portion 2 has connected thereto a connection wire 10 or c–i–h running along the same split but on the side of the lower frame portion 2 and toward that field pole without extending past the split. Thus it will be appreciated that the compensation winding a–b on the main field pole 5 forms a circuit quite separated away from a circuit with the compensation winding d–c on the adjacent main field pole 6. Actually a space formed between the wire portions f–g and i–h forms a part of a space between the main field pole 5 and an interpole 7. As shown at the arrows in FIG. 3, however, the respective flows of current through the wire portions f–g and i–h disposed in substantially parallel relationship are opposite in direction to each other. Therefore if the wire portion f–g is disposed sufficiently close to the wire portion i–h, the presence of those wire portions has no effect upon the two adjacent main field poles 5 and 6. By comparing FIG. 2 with FIG. 3 it will be apparent that the connection wires according to the principles of the invention are the same in function as the connection wires shown in FIGS. 1 and 2.

Figure 5:
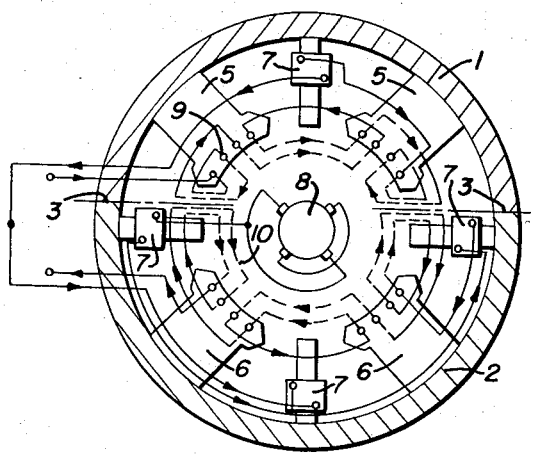
FIGS. 5 and 6 are views similar to FIG. 1. showing schematic cross-sectional views of embodiments shown in FIGS. 3 and 4 respectively.

FIG. 5 shows, diagrammatically, the concept of FIG. 3 as it is actually employed in a motor. By comparing FIG. 5 with FIG. 1 it is seen that the arrangements illustrated are identical in construction to each other except for the manner in which the connection windings are arranged. It is also seen that in the apparatus of FIG. 5, it is not necessary to disconnect any of the connecting wires when the two sections of the motor are separated. That is, from the foregoing it will be appreciated that according to the principles of the invention the connection wires for the compensation winding on one of the main field poles does not extend into the region of the adjacent main field pole. Therefore the invention is advantageous in that upon disassembling the association split frame, the operation of separating the compensation windings is not required to be performed.

Figure 6:
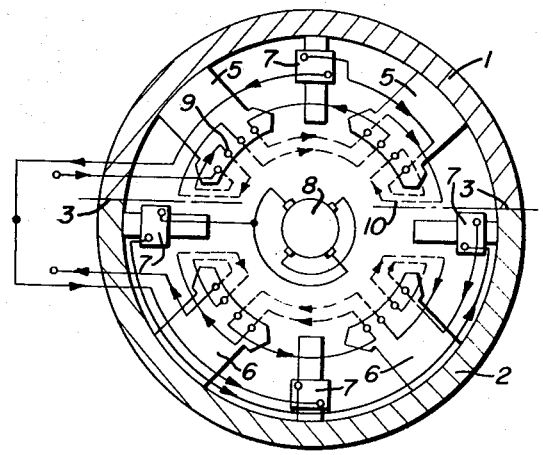

The arrangement shown in FIGS. 4 and 6 wherein the same reference characters designate the components corresponding to those illustrated in FIGS. 3 and 5, is a modification of the invention. As shown in FIGS. 4 and 6, however, the portions f–g and i–h of the connection wires which are disposed in substantially parallel relationship, are disposed on both sides of an interpole 7 located between a pair of adjacent main field poles 5 and 6.

Thus it will be appreciated that the invention has provided an improved direct current dynamoelectric machine having compensation windings inductively disposed on the adjacent man field poles and separated away from each other while these windings perform the same operation as the conventional compensation windings.

What is claimed is:
1. A direct current dynamoelectric machine having an improved compensation winding configuration, comprising main field poles on the stator of the machine, and compensation winding means inductively disposed on the main field poles, the compensating winding means on at least one pair of adjacent main field poles being mechanically separated from each other without forming a conductive loop about the axis of the machine.

2. A direct current dynamoelectric machine as claimed in claim 1, in which said machine has a sectional frame, separable into a plurality of segments wherein said compensation winding means includes one compensation winding on each of the main field poles including a portion running along the edge of its segment and facing the corresponding said winding portion on the adjacent segment.

3. A direct current dynamoelectric machine comprising a machine frame splitable into a plurality of frame portions, a plurality of main field poles positioned within said machine frame, an armature disposed in opposing relationship with respect to said main field poles to form a predetermined gap therebetween, a plurality of compensation windings inductively disposed, respectively, on each of said main field poles to be energized with a current flowing through said armature, wherein the compensation windings on the main field poles disposed adjacent each of the splits of said machine frame each have a connection wire extending along the edge of its corresponding split but not traversing said split, and wherein a current flowing through said connection wire is reversed in direction from that flowing through the adjacent connection wire to offset the effects of the currents flowing through those adjacent connection wires.

4. A direct current dynamoelectric machine, as set forth in claim 3 further comprising an interpole disposed on one side of each said split within a space between said adjacent connection wires.

5. A direct current dynamoelectric machine as set forth in claim 3 wherein an interpole is disposed on one side of each said split between the corresponding main pole and connection wire.

References Cited
UNITED STATES PATENTS
| | | | |
|---|---|---|---|
| 3,296,472 | 1/1967 | Fisher | 310—186 |
| 2,685,057 | 7/1954 | Gilchrist | 310—224 XR |

FOREIGN PATENTS
| | | |
|---|---|---|
| 1,226,704 | 10/1966 | Germany. |
| 568,803 | 1945 | Great Britain. |

MILTON O. HIRSHFIELD, Primary Examiner

B. A. REYNOLDS, Assistant Examiner